United States Patent Office 3,078,650
Patented Feb. 26, 1963

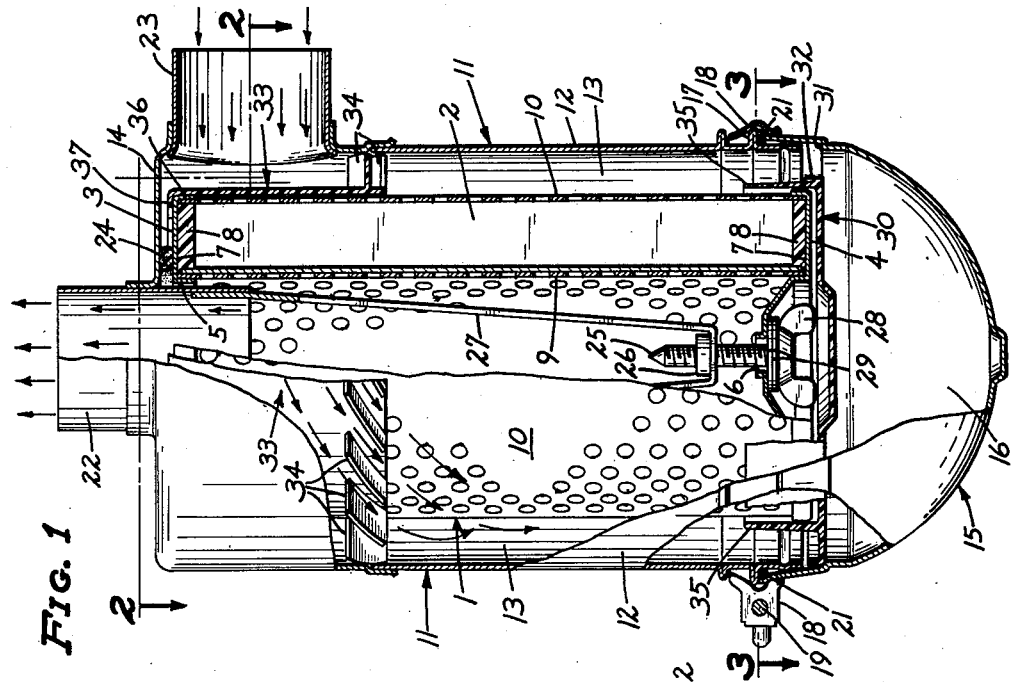
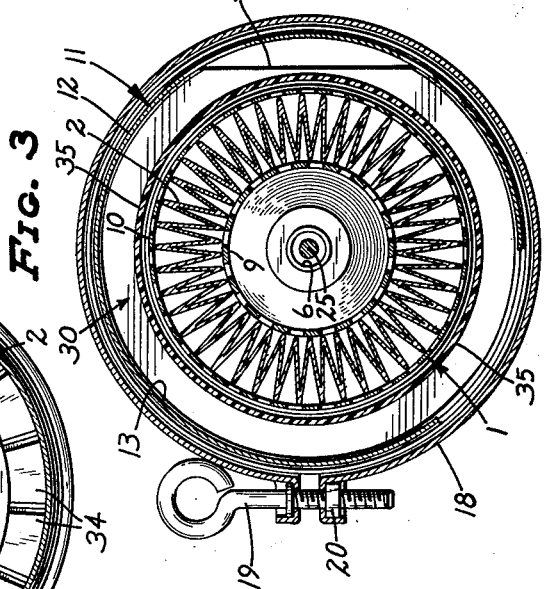
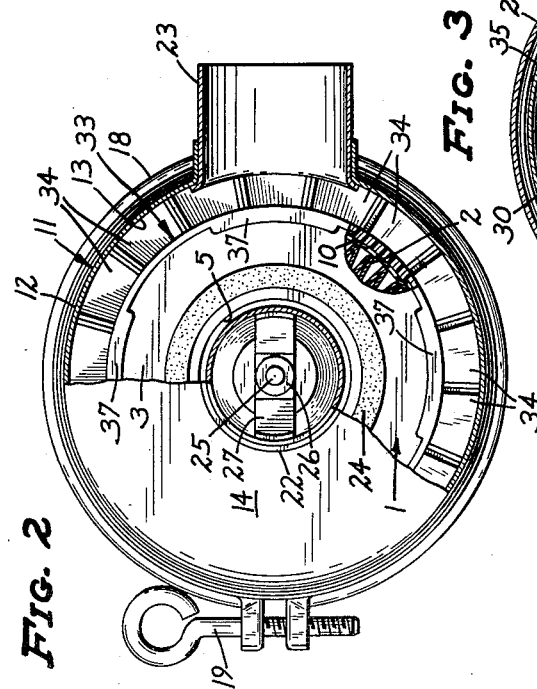
Fig. 1
Fig. 2
Fig. 3
INVENTORS
DALE K. ANDERSON
WILLIAM R. WOLFF
ATTORNEYS

3,078,650
AIR CLEANER
Dale K. Anderson, St. Paul, and William R. Wolff, Newport, Minn., assignors to Donaldson Company, Inc., St. Paul, Minn., a corporation of Delaware
Filed Mar. 20, 1961, Ser. No. 96,823
7 Claims. (Cl. 55—337)

Generally stated, our present invention relates to improvements in air cleaners of a kind that are particularly adapted for use in connection with the intake systems of internal combustion engines such as are used, for example, in various motor-propelled vehicles including tractors, trucks, and the like. More particularly, however, the instant invention relates to air cleaners of the above generally characterized kind which are of a type employing replaceable dry filter elements.

It is common practice in connection with filter-type air cleaners, and particularly those used in connection with the air intake systems of tractors and the like, to employ, in series with and ahead of such filter-type air cleaners, a separate centrifugal type precleaner to remove from the air stream a large percentage of the total dust entrained in the air stream before the air stream reaches the filter-type cleaner, so as to greatly extend practical operating times between periodical filter servicing operations, which latter comprise removal, for cleaning or replacement, of the dry filter unit from the body or shell of the air cleaner. It is also recognized, however, that there are conditions under which it is desirable to omit the centrifugal precleaner function and rely solely upon the air cleaning function of the filter unit.

An important object of the instant invention is the provision of means whereby the centrifugal precleaning function generally obtained by use of an additional air cleaning unit separate and apart from a dry filter type air cleaner may be incorporated within the body of such a dry filter type air cleaner at low cost and without materially increasing or altering the overall size and/or external shape of the body of the filter-type air cleaner.

Another object of the instant invention is the provision in an air cleaner of the kind immediately described above in which certain elements peculiar to the centrifugal precleaning function are carried by and are removable and replaceable with the dry filter unit and in which the structure is such as to function properly either in connection with filter units carrying such centrifugal precleaner elements or with similar dry filter elements devoid of such centrifugal precleaner elements.

A still further object of the invention is the provision of an air cleaner of the kind last described above in which certain elements peculiar to the centrifugal precleaning function are displaceably mounted on the removable and replaceable dry filter unit so that they may be quickly and easily removed therefrom or applied thereto when the said dry filter unit has been removed or displaced from its respective air cleaner body, thus allowing optional use of the centrifugal precleaner elements and also allowing reuse of the same centrifugal precleaning elements with a succession of different replaceable filter units.

The above and other important objects and advantages of the invention will be made apparent from the following specification, claims, and appended drawings where- in like characters indicate like parts throughout the several views.

Referring to the drawings:

FIG. 1 is a view in side elevation, with some parts broken away and some parts shown in section, of an air cleaner incorporating one embodiment of the invention;

FIG. 2 is a transverse sectional view taken approximately on the irregular line 2—2 of FIG. 1 with some parts below the section line broken away; and FIG. 3 is a transverse sectional view taken on the line 3—3 of FIG. 1.

The air cleaner shown in the accompanying drawings comprises an elongated dry-type filter unit of a conventional commercially available variety, indicated as an entirety by 1. This dry air filter unit is of generally cylindrical, generally annular form and, as shown, comprises an annular filtering element or media 2 which may take different forms but which is shown as being and preferably is of the pleated sheet variety and may be assumed to be of resin-treated pleated filter paper of suitable porosity and rigidity. This paper filter element 2, which is preferably pleated longitudinally, defines what may hereinafter be referred to as an annular or generally annular air pervious peripheral filter wall. The dry air filter unit futher comprises generally imperforate end wall portions 3 and 4 respectively, the former of which is annular to provide an axial opening 5 from its respective end of the open central portion of the annular filter element 2 and the latter of which is provided with a bolt receiving axial aperture 6. The generally imperforate end portions 3 and 4 of the filter define generally annular channels 7 in which opposite end portions of the air pervious peripheral filter wall or element 2 are seated and held firmly in place by suitable adhesive sealing compound 8. The useful or air passing portion of the air pervious peripheral wall 2 of the filter is, of course, that portion thereof lying between the opposing surfaces of the adhesive sealing compound 8. For the purpose of protecting the pleated peripheral filter wall or element 2 and adding general rigidity to the filter unit 1, the said filter further comprises inner and outer cylindrical screens 9 and 10 which respectively embrace the inner and outer edges of the pleats of the filter element and extend between the imperforate end wall portions 3 and 4 and are also embedded and sealed in the adhesive sealing compound 8. Preferably, and as shown, these screens 9 and 10 are of highly perforated sheet material, which material may be assumed to be metal.

The filter unit 1 is displaceably contained within a shell-like main body structure indicated as an entirety by 11 and which comprises a generally cylindrical side wall portion 12 surrounding and radially outwardly spaced from the air pervious peripheral filter wall 2 of the generally annular filter unit 1 to define therebetween and the said air pervious peripheral filter wall 2 of the filter unit 1 an annular air passage 13 extending substantially from end to end of the annular filter unit 1.

The cylindrical wall 12 of shell-like main body 11 is closed at one end portion by a fixed or unitary end wall portion 14 and is normally closed at its other end by an axially outwardly displaceable cup-like body section 15 that projects well beyond one end of the filter unit 1 to provide a dust receptacle 16. The cup-like body section 15 is telescopically applied over its associated end of the cylindrical body wall 12 to the limit allowed by a body stop shoulder or flange 17 and is releasably secured in such position by suitable means such as a conventional split clamping band 18 and cooperating threaded clamping bolt 19 and nut 20. As shown, the cup-like body element or member 15 defines an end portion of the cylindrical body side wall 12. Preferably, a sealing gasket 21 is applied between the adjacent portions of the cup-like body section 15 and body stop shoulder 17. The body end wall portion 14 is centrally apertured to receive and has fixed therein an axially extending air discharge tube 22, the outer end portion of which is adapted to be connected to the air intake system of an internal combustion engine or the like, not shown, and the inner end of which projects through the central aperture 5 and end wall portion 3 of the filter unit 1 to receive clean air from the open interior of the annular filter unit 1.

In air cleaners of the general character described, it is desirable to direct air and such dust as may be entrained therein into that end portion of the annular air intake passage 13 opposite the dust deceptacle 16. In the cleaner illustrated, this function is accomplished by air directing means in the form of an air intake tube 23 carried by and opening radially through an end portion of the cylindrical body wall 12 into the annular air passage 13.

The imperforate end wall portion 3 of the filter unit 1 and the end wall 14 of the main body are in displaceable annular air sealing engagement through the medium of a resilient annular seating gasket 24. The gasket 24 is preferably cemented or otherwise secured to the filter end wall 3 so as to become part of the removable filter unit. Hence, the engaged surfaces of the gasket 24 and body end wall 14 may be said to comprise mating annular sealing surfaces. The filter unit 1 is normally but displaceably held in its operative position shown by suitable means such as the threaded wing bolt 25 and cooperating threaded nut 26. The nut 26 fixed to and carried by a U-shaped yoke 27 depends from and is rigidly carried by the axial air discharge or outlet tube 22. As will be seen best by reference to FIG. 1, bolt 25 extends inwardly through the central aperture 6 in the end wall 4 of the annular filter unit 1 and has its winged head 28 and washers 29 located outwardly of the filter unit wall 4. Hence, the bolt head is readily accessible for finger manipulation when the cup-like body section 15 is removed from the main body and the washers 29 seal the aperture 6. Of course, this structure allows removal and replacement of the filter unit when the cup-like body section is displaced from the main body.

The end of the annular air passage 13 adjacent the dust receptacle 16 and the inner end of said dust receptacle 16 is defined by a disc-like partition wall 30. In the preferred embodiment of the invention illustrated, this partition wall 30 is freely seated on an annular shoulder means 31 of the cup-like body element 15, as shown best in FIG. 1. Hence, when dust receptacle defining cup-like body element 15 is removed, the partition wall 30 is removable through the then open end of the cup-like body element 15 to allow easy emptying of collected dust from the receptacle 16 defined by the cup-like element 15. However, when parts are in their operative positions shown, the partition wall 30 is held in place against the shoulder means 31 by the end of the cylindrical body wall 12. As shown best in FIGS. 1 and 3, partition wall 30 is cut away at 32 to provide a restricted dust passage or port providing communication between the annular air passage 13 and the dust receptacle 16, but otherwise closes off communication between said annular passage and said dust receptacle.

In accordance with the invention the air cleaner structure defines an imperforate annular baffle wall 33 closely surrounding the end portion of the air pervious peripheral filter wall 2 of the filter unit 1 opposite the end thereof that is adjacent the dust receptacle 16. This baffle wall 33 is radially inwardly spaced from the outer cylindrical wall 12 of the annular passage 13 to allow free flow of air from the air intake tube 23 through the radially adjacent initial portion of said air passage 13 and is spaced from major areas of the pleated peripheral filter wall 2 to allow air from that portion of the anular air passage 13 inwardly beyond the inner end of said baffle wall 33 to pass to portions of the air pervious peripheral filter wall 2 radially inwardly adjacent the said baffle wall. The generally imperforate baffle wall 33 has air sealing relationship, at its outer end portion, with the end wall 3 of the filter unit and extends axially inwardly beyond the air inlet tube 23 where it is provided with a series of circumferentially spaced air directing blades 34 that project radially therefrom into the annular air passage 13. These blades 34 impart an annular direction to the air and air-borne dust that causes the air and the dust entrained therein to whirl in and about the axis of the annular air passage, whereby the heavier particles of air-borne dust are forced radially outwardly by centrifugal force and are caused to travel in a spiral path against the outer wall 12 of the annular air passage 13 toward the dust receptacle 16, while the air and lighter particles of dust and other light foreign matter turn radially inwardly to the air pervious peripheral filter wall 2 which makes the final separation and passes only clean air to the outlet 22.

When whirling, centrifugally separated dust reaches the partition wall 30 it passes through the restricted dust passage or port 32 into the dust receptacle 16. However, it will be appreciated that the whirling dust travels at progressively reduced velocity as it progresses through the annular passage toward the dust receptacle. Hence, because the dust is subject to greatly reduced centrifugal force by the time it reaches the ported partition wall 30, there is serious tendency for centrifugally separated dust in the vicinity of the baffle wall 30 to become entrained in air passing radially inwardly to the peripheral filter wall 2. In accordance with the instant invention, however, this efficiency defeating tendency is overcome and overall efficiency increased by provision of an air imperforate annular baffle wall 35.

This annular baffle wall 35 closely surrounds its respectively associated end portion of the air pervious peripheral filter wall 2 and is radially spaced from the outer cylindrical wall 12 of passage 13 to allow free passage of dust to and through the dust passage or port 32 to the dust receptacle 16. Also, said annular baffle wall 35 is spaced from major areas of the radially adjacent portions of the air pervious pleated peripheral filter wall 2 to allow free passage of air thereto. Of course, because the filter wall 2 is pleated this would be true even if the annular baffle wall 35 tightly engaged the outer edge of the pleats of the peripheral filter wall. Preferably, and as illustrated, the annular baffle wall 35 is formed as an integral part of and projects axially inwardly from the partition wall 30, as best shown in FIG. 1. In fact, the partition wall 30 and baffle wall 35 may be integrally formed of a suitable plastic material such as "nylon."

In practice, the annular baffle wall 35 is very effective in preventing dust travelling at reduced angular velocity in end portion of the annular air passage 13 radially adjacent thereto and adjacent the partition wall 30 from being entrained in air that turns radially inwardly to the air pervious peripheral filter wall 13. In fact, the addition of this annular baffle wall 35 contributes greatly to the overall efficiency of the precleaning function of the air cleaner.

The most desirable axial length of the annular baffle 35, with respect to the distance it extends inwardly beyond the plane of its respectively associated end of the air passing portion of the peripheral filter wall 2, varies considerably with air cleaner structures of different sizes and proportions and other variable design and use factors, but will usually be within the range of five percent (5%) to fifteen percent (15%) of the total length of the operative air passing portion of the air pervious annular peripheral filter wall 2. In the case of the instant air cleaner design best results have been obtained with a baffle wall 35 that surrounds a portion of its respective end of the air passing portion of the peripheral filter wall 2 approximately equal to between eight percent (8%) to ten percent (10%) of the total length of the said air passing or operative portion of said filter wall 2 of the filter unit 1.

From the above it should be evident that the annular baffle wall 33, the air directing means (specifically comprising blades 34) for causing the air and air-borne dust to travel spirally about the annular air passage 13, and the ported partition wall 30 and associated annular baffle wall 35 cooperate to produce a very efficient centrifugal precleaning effect within the main body of the cleaner and without materially or appreciably altering the dimensions of the main body or shell 11 of the cleaner.

The annular baffle wall 33 and associated blades 34 are preferably molded from a resilient and elastic plastic material such as "nylon," for example. By reference to FIG. 1 it will be seen that filter end wall 3 has an outer annular flange 36 that projects radially beyond the filter wall 2 and screen 10. Also, by reference to FIG. 1, it will be seen that the annular baffle wall 33 is telescoped over the flange 36 to the full extent permitted by engagement of inturned arcuate flanges 37 of the baffle wall 33 with the filter end wall 3. In practice, the elastic baffle wall 33 is made slightly undersize with respect to the flange 36 so that it exerts sufficient contracting force on the flange 36 of the filter end wall 3 to prevent accidental displacement of the baffle wall 33 from the filter and so as to provide a tight air seal between the baffle wall 33 and filter end wall 3, while allowing intentional removal of and application of the baffle wall 33 to the filter when the latter is removed from the main body of the air cleaner.

The air cleaner described can be used either in a vertical position, as shown, or in a horizontal position. When the air cleaner is disposed horizontally, the air intake tube 23 will usually be disposed at the top and extend upwardly to be connected to a conventional standpipe. Also, when the cleaner is operated in a horizontal position, the restricted dust passage or port 32 should be at the top.

Our invention has been thoroughly tested and found to be completely satisfactory for the accomplishment of the objectives set forth; and while we have shown certain preferred designs, it will be understood that the same is capable of modification without departure from the scope and spirit of the invention as defined in the claims.

What is claimed is:

1. An air cleaner structure comprising a combination of an air inlet tube feeding the top region of a cylindrical side wall, said side wall being fitted on its bottom with a removable cup-shaped dust receptacle and on its top with an axial outlet tube, said side wall containing a replaceable annular gas pervious filter wall containing radially spaced inner and outer wall surfaces, the outer wall surface being inwardly spaced from said cylindrical side wall to define an annular intake passage, said air cleaner structure having a disk-like partition wall covering the inner end of said dust receptacle, said partition wall having a restricted opening between said annular intake passage and said dust receptacle, said air cleaner structure further having a first annular baffle located about but spaced from an upper portion of said outer filter wall surface and having a plurality of radially outwardly projecting air deflecting blades attached to the periphery thereof, adapted to produce whirling motion to incoming unfiltered air passing therethrough, and having further a second annular baffle spaced from and closely surrounding the end portion of said outer filter wall surface adjacent said dust receptacle which projects axially upwardly from said partition wall and which is so associated with said filter and said partition wall that dust can freely pass from the end region of said annular intake passage through said restricted opening and into said dust receptacle thereby tending to prevent deposition of dust particles on the end regions of said outer filter wall surface.

2. In an air cleaner structure comprising a cylindrical side wall fitted with a removable dust receptacle on one end and containing a replaceable annular filter including an air-pervious outer peripheral filter wall, an air-pervious inner peripheral filter wall, and opposite filter end walls, said outer peripheral filter wall being outwardly spaced from said cylindrical side wall to define an annular intake passage and said inner peripheral filter wall defining an annular axial outlet passage, the improvement in centrifugal type precleaners which comprises the combination of a disk-like partition wall covering the inner end of said dust receptacle, said partition wall having a restricted opening between said annular intake passage and said dust receptacle, a first annular baffle located about but spaced from an upper portion of said outer peripheral filter wall having a plurality of radially outwardly projecting air-deflecting blades attached to the periphery thereof adapted to induce whirling motion to incoming unfiltered air passing therethrough, a second annular baffle spaced from and closely surrounding the end portion of said outer peripheral filter wall adjacent said dust receptacle which projects axially inwardly from said partition wall and which is so associated with said filter and said partition wall that dust can freely pass at reduced velocity from the end region of said outer annular intake passage through said restricted opening and into said dust receptacle thereby tending to prevent the entrainment of dust particles upon end regions of said outer peripheral filter wall.

3. In an air cleaner construction comprising a cylindrical side wall fitted with a removable dust receptacle on one end and containing a replaceable annular filter including an air-pervious outer peripheral filter wall inwardly spaced from said cylindrical side wall to define an annular intake passage, an air-pervious inner peripheral filter wall defining an annular axial outlet passage, and opposite filter end walls, said dust receptacle having a disk-like partition wall covering its inner end, said partition wall having a restricted opening between said annular intake passage and said dust receptacle, there being in such construction a first annular baffle spaced from said outer peripheral filter wall and having a plurality of radially outwardly projecting air deflecting blades attached to the periphery thereof adapted to induce whirling motion to incoming unfiltered air passing therethrough, the improvement which comprises a second annular baffle spaced from and closely surrounding the end portion of said outer peripheral filter wall adjacent said dust receptacle which projects axially inwardly from said partition wall and which is so associated with said filter and said partition wall that dust can freely pass from the end region of said annular intake passage through said restricted opening and thence into the dust receptacle thereby minimizing deposition of dust particles upon the bottom regions of said outer peripheral filter wall.

4. The structure defined in claim 3 in which the said second annular baffle wall projects axially inwardly of the plane of the adjacent end of the air passing portion of the outer peripheral filter wall a distance which equals not less than five percent (5%) of the length of said portion of said filter wall.

5. The structure defined in claim 3 in which the said second annular baffle wall projects axially inwardly of the plane of the adjacent end of the air passing portion of the outer peripheral filter wall a distance which equals not less than seven and one-half percent (7½%) of the length of said portion of said filter wall.

6. The structure defined in claim 3 in which the said second annular baffle wall projects axially inwardly of the plane of the adjacent end of the air passing portion of the outer peripheral filter wall a distance which equals not less than ten percent (10%) of the length of said portion of said filter wall.

7. The structure defined in claim 3 in which the said second annular baffle wall projects axially inwardly of the plane of the adjacent end of the air passing portion of the outer peripheral filter wall a distance which equals not less than fifteen percent (15%) of the length of said portion of said filter wall.

References Cited in the file of this patent
UNITED STATES PATENTS

| | | |
|---|---|---|
| 1,107,485 | Bowser | Aug. 18, 1914 |
| 1,881,049 | Garner et al. | Oct. 4, 1932 |
| 2,010,456 | Jones | Aug. 6, 1935 |
| 2,226,045 | Baldwin | Dec. 24, 1940 |
| 2,894,600 | Veres | July 14, 1959 |